United States Patent [19]

Mueller et al.

[11] Patent Number: 4,684,573
[45] Date of Patent: Aug. 4, 1987

[54] HIGH OXYGEN BARRIER COMPOSITE FILM

[75] Inventors: Walter B. Mueller, Taylors; Henry G. Schirmer, Spartanburg, both of S.C.

[73] Assignee: W. R. Grace & Co., Cryovac Div., Duncan, S.C.

[21] Appl. No.: 839,441

[22] Filed: Mar. 10, 1986

Related U.S. Application Data

[63] Continuation of Ser. No. 709,010, Mar. 7, 1985, abandoned.

[51] Int. Cl.⁴ .......................... C09J 7/02; B32B 27/08
[52] U.S. Cl. .................... 428/349; 156/309.3; 264/172; 427/208.2; 427/214; 427/385.5; 427/407.1; 428/35; 428/354; 428/515; 428/516; 428/518; 428/913
[58] Field of Search .......... 428/35, 349, 354, 518, 428/516, 515, 447; 427/385.5, 407.1, 208.2, 214; 264/172; 156/309.3

[56] References Cited

U.S. PATENT DOCUMENTS

| | | | |
|---|---|---|---|
| 4,405,667 | 9/1983 | Christensen et al. | 428/35 |
| 4,501,798 | 2/1985 | Koschak et al. | 428/349 |
| 4,576,988 | 3/1986 | Tanaka et al. | 428/447 |

FOREIGN PATENT DOCUMENTS

| | | | |
|---|---|---|---|
| 2014471A | 8/1979 | United Kingdom | 427/385.5 |
| 2014476A | 8/1979 | United Kingdom | 427/385.5 |
| 2106471A | 4/1983 | United Kingdom | 428/35 |
| 2121062A | 12/1983 | United Kingdom | 428/475.5 |

OTHER PUBLICATIONS

Technical Bulletin No. KIC-102 from Kurary, "Gas Permeation of EVAL".
T. Iwanami et al., Tappi Journal, vol. 66, No. 10, Oct. 1983, pp. 85-90.

Primary Examiner—Thomas J. Herbert
Attorney, Agent, or Firm—John J. Toney; William D. Lee, Jr.; Mark B. Quatt

[57] ABSTRACT

High oxygen barrier characteristics over a wide range of humidity conditions are obtained by providing a combination of ethylene vinyl alcohol copolymer and vinylidene chloride copolymer in separate component films of a composite film.

10 Claims, 2 Drawing Figures

HIGH OXYGEN BARRIER COMPOSITE FILM

This application is a continuation of application Ser. No. 709,010 filed on Mar. 7, 1985, now abandoned.

BACKGROUND OF THE INVENTION

This invention relates to thermoplastic film, and more particularly a thermoplastic film which provides a high oxygen barrier. More particularly, this invention relates to a thermoplastic composite film which provides a high oxygen barrier.

It is well known that ethylene vinyl alcohol copolymers (EVOH) may act as an oxygen barrier in multilayer films. It is also known that vinylidene chloride copolymer, commonly known as saran, may also exhibit oxygen barrier characteristics in a multilayer film. However, the characteristics of these barrier agents are such that their effectiveness as oxygen barriers is affected by the humidity of the environment in which the film is used, i.e., the barrier properties of these barrier agents are humidity sensitive.

The article *Ethylene Vinyl Alcohol Resins for Gas-Barrier Material* by T. Iwanami and Y. Hirai discusses the humidity dependence of ethylene vinyl alcohol in estimating its gas-barrier properties. Ethylene vinyl alcohol has good gas-barrier properties, including oxygen barrier properties in low-humidity conditions, but these properties degrade at high humidity. It is known to coat polyvinyl alcohol with for example saran, and to construct a multilayer film in which a core layer of ethylene vinyl alcohol is sandwiched between layers including for example a saran-coated web and heat-sealant layer.

It is, therefore, an object of the present invention to provide a thermoplastic film in which high oxygen barrier characteristics are obtained.

It is a further object of the invention to provide a thermoplastic film in which high oxygen barrier characteristics are obtained over a wide range of humidity conditions.

It is a further object of the present invention to provide a thermoplastic composite film in which high oxygen barrier characteristics are obtained.

It is a further object of the present invention to provide a thermoplastic composite film in which high oxygen barrier characteristics are obtained over a wide range of humidity conditions.

It is a further object of the present invention to provide a thermoplastic composite film in which high oxygen barrier characteristics are obtained over a wide range of humidity conditions, the composite film being formed from four individual films which are bonded to each other by corona bonding.

SUMMARY OF THE INVENTION

In accordance with the present invention, there is provided a thermoplastic composite film, comprising a first component film including an abuse-resistant layer; a second component film including a layer of vinylidene chloride copolymer; a third component film including a layer of ethylene vinyl alcohol copolymer; and a fourth component film including a heat-sealable layer.

A preferred embodiment includes a first film comprising a surface layer of ethylene vinyl acetate copolymer, a core layer of linear low density polyethylene, and a second surface layer of ethylene vinyl acetate copolymer; a second film comprising a surface layer blend of polyethylene and ethylene vinyl acetate copolymer, an interior layer of a blend of polyethylene and ethylene vinyl acetate copolymer, an adhesive layer, a layer of ethylene vinyl alcohol, a second adhesive layer, and a second surface layer of ethylene vinyl acetate copolymer; a third film comprising a skin layer of ethylene vinyl acetate copolymer, an interior layer of linear low density polyethylene, a second interior layer of ethylene vinyl acetate copolymer, a core layer of vinylidene chloride copolymer, a layer of ethylene vinyl acetate copolymer, and a second surface layer of ethylene vinyl acetate copolymer; and a fourth film comprising a first surface layer of ethylene vinyl acetate copolymer, a core layer of linear low density polyethylene, and a second surface layer of ethylene vinyl acetate copolymer.

The method of the invention provides for a process for making a thermoplastic composite film, comprising melt forming a first, second, third, and fourth film, and corona bonding the individual films to provide a composite film in accordance with the invention.

BRIEF DESCRIPTION OF THE DRAWING

Further details are given below with reference to the drawings wherein.

DESCRIPTION OF THE PREFERRED EMBODIMENTS

Figure 1:
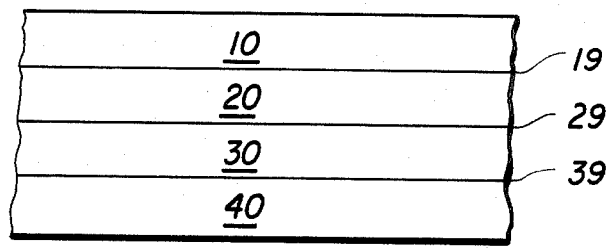
FIG. 1 is a schematic cross-section of a composite film of the invention.

Referring specifically to FIG. 1, a schematic cross-section of the composite film of the invention is shown. The composite film structure is directed to a multi-component composite having the generalized structure A/B/C/D where A and D are surface component films, and B and C are interior barrier component films.

Specifically, first component film 10 forms one of the surface component films of the present composite film. Preferably, the first component film 10 includes abuse resistant materials such as for example polypropylene or its copolymers; nylon and its copolymers; nylon 11 or 12; polyesters; polyurethanes; ethylene vinyl acetate copolymer; and blends of the above. A preferred ethylene vinyl acetate has a vinyl acetate content of about 4.5%.

Second component film 20 forms one of the interior barrier component films of the present composite film. Component film 20 includes a layer of ethylene vinyl alcohol copolymer.

The third component film 30 forms another of the interior barrier component films of the present invention. The third component film 30 includes a layer of vinylidene chloride copolymer or saran.

The fourth component film 40 forms another of the surface component films of the present invention. The fourth component film 40 includes a layer of a heat sealable material such as for example polyethylene or its copolymers such as ionomer (Surlyn), ethylene vinyl acetate copolymer, ethyl methacrylate copolymer, and linear low density polyethylene; polypropylene or its copolymers such as ethylene propylene copolymer and butylene propylene copolymer; polyesters; copolymers of nylon; nylon 11 and 12; and polyurethanes.

Figure 2:
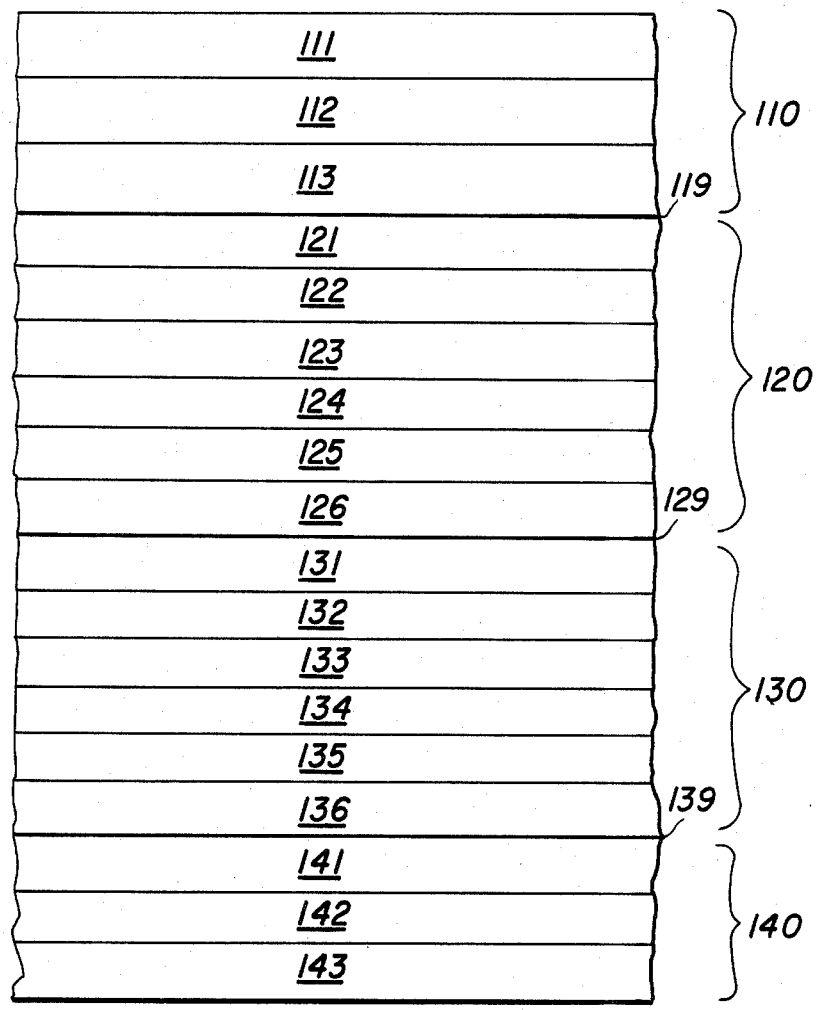
FIG. 2 is a schematic cross-section of a preferred embodiment of a composite film of the invention.

Referring now to FIG. 2, a schematic cross-section of a preferred embodiment of the composite film of the invention is shown. The composite film structure is directed to a multi-component composite having the generalized structure A/B/C/D where A and D are surface components, and B and C are interior barrier component films.

Specifically, first component film 110 forms one of the surface component films of the composite film of the present invention. Component film 110 comprises a first or surface layer 111 of ethylene vinyl acetate copolymer, a core layer 112 of linear low density polyethylene and a second layer surface layer 113 of ethylene vinyl acetate copolymer.

Second component film 120 forms one of the interior barrier component films of the present composite film. Component film 120 comprises a first or surface layer 121 of ethylene vinyl acetate copolymer, a second or interior layer 122 of ethylene vinyl acetate copolymer, a third or interior adhesive layer 123, a fourth or interior layer 124 of ethylene vinyl alcohol copolymer, a fifth or interior adhesive layer 125, and a sixth surface layer 126 of ethylene vinyl acetate copolymer.

The third component film 130 forms another of the interior barrier component films of the present invention. The third component film 130 comprises a first or surface layer 131 of ethylene vinyl acetate copolymer, a second or interior layer 132 of linear low density polyethylene, a third or interior layer 133 of ethylene vinyl acetate copolymer, a fourth or interior layer 134 of vinylidene chloride copolymer, a fifth or interior layer 135 of ethylene vinyl acetate copolymer, and a sixth or surface layer 136 of ethylene vinyl acetate copolymer.

The fourth component film 140 forms another of the surface component films of the present invention. The fourth component film 140 of the present composite film comprises a first or surface layer 141 of ethylene vinyl acetate copolymer, a second or core layer 142 of linear low density polyethylene, and a third or surface layer 143 of ethylene vinyl acetate copolymer.

The component films 110, 120, 130, and 140 of the composite film in accordance with the present invention are preferably of about equal thickness, and more preferably of a thickness of about 1 mil each.

These films may be joined together preferably by corona bonding to produce a composite film of preferably about 4 mils thickness. When corona bonding is used to join these component films, ethylene vinyl acetate is preferred in the outermost layers of each component film to effect an adequate bond. Because of cost considerations, ethylene vinyl acetate copolymers of about 3.5% to 4.5% by weight of vinyl acetate are most preferred.

The term "composite" is used herein to describe a film which is made up of individual films which themselves may be produced from the coextrusion of two or more individual layers, or otherwise produced from two or more individual layers of various thermoplastic materials, adhesive layers, etc.

The term "component film" is used herein to describe one or more of films 10, 20, 30, and 40, which serve to make up the composite film after corona bonding or some other bonding process is applied to the component films.

Referring once again to FIG. 2, the ethylene vinyl acetate layers 111 and 113 of component film 110 are preferably ethylene vinyl acetate copolymers with a vinyl acetate content of about 3.5%. A suitable ethylene vinyl acetate copolymer is PE204-CS95 available from El Paso Products Company.

Core layer 112 of component film 110 is preferably a linear low density polyethylene resin, commercially available for example as Dowlex 2045, a resin produced by Dow Chemical Company. This representative resin has a density of about 0.920 grams per cubic centimeter.

First and second layers 121 and 122 respectively of component film 120 are preferably ethylene vinyl acetate copolymer such as Alathon F-3445 made by DuPont Company. Alternately, layers 121 and 122 may be the same as the ethylene vinyl acetate copolymers used in layers 111 and 113 of component film 110. The third and fifth layers 123 and 125 respectively, are adhesive layers employing an adhesive such as Plexar 158 available from Chemplex Company. The fourth layer 124 of component film 120 is preferably ethylene vinyl alcohol copolymer. A representative example is EVAL EC-F101 resin available form EVAL Co. of America.

The first and sixth layers 131 and 136 respectively of component film 130 are preferably ethylene vinyl acetate copolymers with a vinyl acetate content of preferably about 3.5%, such an ethylene vinyl acetate copolymer being available from El Paso Products Company as PE204-CS95 copolymer EVA resin as discussed above. The second layer 132 of component film 130 is preferably linear low density polyethylene with a density of preferably 0.920 grams per cubic centimeter, such as the Dowlex 2045 resin discussed above. The third layer 133 of component film 130 is preferably ethylene vinyl acetate copolymer. A suitable resin is Elvax 3128 ethylene vinyl acetate resin supplied by DuPont Company. The fourth layer 134 of component film 130 is vinylidene chloride copolymer and preferably a low viscosity unplasticized saran such as PV858 available from Solvay. The saran layer 134 may also include minor amounts of a suitable stabilizer, and other additives may be included, such as extrusion aids. The fifth layer 135 and sixth layer 136 of component film 130 are preferably made up of ethylene vinyl acetate copolymers. The fifth layer 135 is ethylene vinyl acetate copolymer, and is available for example from DuPont Company as Elvax 3128 EVA resin. Sixth layer 136 is an ethylene vinyl acetate copolymer with preferably about 3.5% vinyl acetate, as for example PE204-CS95 copolymer EVA resin as discussed above.

First or surface layer 141 of component film 140 is preferably ethylene vinyl acetate copolymer similar to that present in first layer 111 of component film 110 discussed above. The core layer 142 of component film 140 is preferably linear low density polyethylene similar to that present in second layer 112 of component film 110. The third layer 143 of component film 140 is preferably ethylene vinyl acetate copolymer similar to third layer 113 of component film 110.

It has been found that saran or vinylidene chloride copolymer exhibits better barrier characteristics to oxygen transmission when wet than when dry. Generally, the reverse holds true for ethylene vinyl alcohol copolymer i.e. ethylene vinyl alcohol exhibits better barrier characteristics to oxygen when dry than when wet. It has now been discovered that the combination of both of these materials in the composite film of the present invention produces a composite film with remarkably improved oxygen barrier characteristics.

Table I below demonstrates the oxygen transmission rates of each of the component films of the preferred embodiment of the present invention, and the oxygen transmission rates under both dry and wet conditions for the composite film itself. As is demonstrated in the table, the oxygen transmission rates for the composite film under both dry and wet conditions are much superior to the overall (wet/dry) rates for any of the component films A through C. In this example, Component A represents both surface layers A and D, A and D being identical in this case.

TABLE 1

| Oxygen transmission[1] | COMPONENT A | COMPONENT B | COMPONENT C | COMPONENT ABCA |
|---|---|---|---|---|
| @ 73° F., 0% RH | too high for equipment | negligible | 16.6 | 1.0 |
| @ 73° F. 100% RH | too high for equipment | 84.1 | 4.8 | .7 |

NOTES: [1]Units of cubic centimeters STP (24 hours, square meter, atmosphere)

At 0% RH, ASTM D 3985. At 100% RH, the "sandwich" method discussed in *ASTM Journal of Testing and Evaluation*, Volume 12, Number 3, May 1984 at pages 149–151. Testing is performed on Ox-Tran Oxygen Permeability Testing Equipment.

The arrangement of the layer of ethylene vinyl alcohol copolymer and the layer of vinylidene chloride copolymer need not be limited to that described and shown in FIG. 2 and component films 120 and 130 respectively. For example, the component film including the ethylene vinyl alcohol and the component film including the vinylidene chloride copolymer may be arranged so that the EVOH-bearing film is represented by reference numeral 130 in FIG. 2 and the saran-bearing film is represented by reference numeral 120 in FIG. 2.

This interchangeability of the EVOH-bearing component film and the saran-bearing component film within the composite film structure, as well as other advantages of the invention, is further demonstrated in Table 2 below. Tomato puree was packaged in two specimens of a pouch constructed in accordance with the preferred embodiment of the present invention. The control, a number 10 can of tomato puree was used. These materials underwent accelerated age storage to determine their effectiveness in maintaining the color of the tomato product. Since ascorbic acid content is degraded by oxygen, this is a good method of determining the oxygen barrier characteristics of the material in question. The rate of ascorbic acid oxidation is heavily influenced by the dissolved oxygen present. Table 2 represents the monitoring of ascorbic acid content during storage and accelerated aging of the tomato product in the packagining material. "Accelerating aging" is used herein to mean the aging of a material at elevated temperature and/or relative humidity to simulate long-term aging under typical storage conditions. Eight weeks of accelerated aging equates approximately to one year of storage. The first pouch, labeled "saran in-A" had the saran layer between the EVOH layer and the product. This would replicate the structure shown for example in the preferred embodiment and in FIG. 2. Two specimens A and B were used. The second pouch represented by "saran out" had the EVOH layer between the saran layer and the product. Two specimens A and B were used. As a control, a number 10 can of tomato puree was tested, including two specimens A and B. The results are as indicated in Table 2. The AOAC (Association of Official Analytical Chemists) method for ascorbic acid determination by 2,6-Dichloroindophenol titration was used. Surprisingly, it did not appear that the relative positions of the saran-bearing component film and the EVAL-bearing component film with respect to the product was a significant factor in the oxygen barrier behavior of the composite film as a whole.

TABLE 2

| Sample I.D. | Storage °F./% RH | Initial | Ascorbic Acid Content mg/100 gms. Accelerated Aged | | | |
|---|---|---|---|---|---|---|
| | | | Two Weeks | Four Weeks | Six Weeks | Eight Weeks |
| Saran In-A | 100/80 | 14.7 | 11.0 | 7.6 | 7.8 | 8.3 |
| Saran In-B | 100/80 | 14.5 | 11.3 | 8.2 | 8.2 | 8.2 |
| Saran Out-A | 100/80 | 14.2 | 11.3 | 9.9 | 8.7 | 7.6 |
| Saran Out-B | 100/80 | 14.5 | 11.6 | 10.0 | 8.9 | 8.0 |
| #10 Can-A | 100/80 | 14.3 | 8.7 | 11.2 | 9.8 | 9.4 |
| #10 Can-B | 100/80 | 14.3 | 9.0 | 11.3 | 9.8 | 9.1 |
| Saran In-A | 100/40 | 14.7 | 11.1 | 11.8 | 8.7 | 8.2 |
| Saran In-B | 100/40 | 14.5 | 11.3 | 11.9 | 9.1 | 8.0 |
| Saran Out-A | 100/40 | 14.2 | 11.2 | 12.2 | 10.3 | 10.1 |
| Saran Out-B | 100/40 | 14.5 | 11.4 | 12.6 | 10.5 | 10.5 |
| #10 Can A | 100/40 | 14.3 | 10.4 | 10.1 | 9.7 | 8.3 |
| #10 Can B | 100/40 | 14.3 | 10.0 | 9.9 | 9.7 | 9.3 |

The method of the invention provides for a process for making a composite film from four component films comprising coextruding each of component films A through C, and then corona bonding the component films to product the composite film of the present invention. Corona bonding may be accomplished by means well known in the art. Thus, the composite film will exhibit a corona-bonded interface at 19, 29, and 39 (See FIG. 1) or at 119, 129, and 139 (see FIG. 2). Alternatively, the method of the invention provides for a process for making a coextruded thermoplastic film comprising coextruding an abuse resistant material, an interior layer of ethylene vinyl alcohol copolymer, a second interior layer of vinylidene chloride copolymer, and a second surface layer of a heat sealable material.

Composite films made in accordance with the present invention are suitable for example in making hot fill shelf stable food packages, and in particular have a potential use in long-term storage of twelve to eighteen months for products such as catsup and tomato sauce.

Although the present invention has been described in conjunction with preferred embodiments it is to be understood that modifications and variations may be utilized without departing from the principles and scope of the invention, as those skilled in the art will readily understand. Accordingly, such modifications and variations may be practiced within the scope of the following claims.

What is claimed is:

1. A thermoplastic, composite film comprising:
   (a) a first component film comprising an abuse-resistant layer;

(b) a second component film adhered to one surface of the first component film;

(c) a third component film adhered to a surface of the second component film opposite said first component film; and (d) a fourth component film adhered to a surface of the third component film opposite said second component film and comprising a heat sealable layer;

wherein one of said second and third component films comprises an individually extruded vinylidene chloride copolymer, and the other of said second and third component films comprises an ethylene vinyl alcohol copolymer.

2. The film of claim 1 wherein said second component film is a coextruded film.

3. The film of claim 1 wherein said first, second, third and fourth component films are bonded together by means of corona bonding.

4. The film according to claim 1 wherein the first component film forms the outside component of the composite film.

5. The film according to claim 1 wherein the fourth component film forms the inside of the composite film.

6. The composite film according to claim 1 wherein the first and third surface layers of the first component film, the sixth or surface layer of the second component film, the first and sixth surface layers of the third component film, and the first and third surface layers of the fourth component film are ethylene vinyl acetate copolymer wherein the vinyl acetate content is about 3.5%.

7. A composite film comprising:
a first component film comprising
 (a) a first or surface layer of ethylene vinyl acetate copolymer,
 (b) a second or core layer of linear low density polyethylene, and
 (c) a third or surface layer of ethylene vinyl acetate copolymer;
a second component film adhered to a surface of the first component film and comprising
 (a) a first or surface layer of a blend of polyethylene and ethylene vinyl acetate copolymer,
 (b) a second or interior layer of a blend of polyethylene and ethylene vinyl acetate copolymer,
 (c) a third or interior adhesive layer,
 (d) a fourth or interior layer of ethylene vinyl alcohol copolymer,
 (e) a fifth or interior adhesive layer, and
 (f) a sixth or surface layer of ethylene vinyl acetate copolymer;
a third component film adhered to a surface of the second component film opposite said first component film and comprising
 (a) a first or surface layer of ethylene vinyl acetate copolymer,
 (b) a second or interior layer of linear low density polyethylene,
 (c) a third or interior layer of ethylene vinyl acetate copolymer,
 (d) a fourth or barrier layer of vinylidene chloride copolymer,
 (e) a fifth or interior layer of ethylene vinyl acetate copolymer, and
 (f) a sixth or surface layer of ethylene vinyl acetate copolymer; and
a fourth component film adhered to a surface of the third component film opposite said second component film and comprising
 (a) a first or surface layer of ethylene vinyl acetate copolymer,
 (b) a second or core layer of linear low density polyethylene, and
 (c) a third or surface layer of ethylene vinyl acetate copolymer;
wherein the first, second, third, and fourth component films are individually extruded and then bonded together to produce the composite film.

8. The process for making a composite film comprising:
 (a) melt forming a first component film including an abuse-resistant layer;
 (b) melt forming a second component film including a layer of vinylidene chloride copolymer;
 (c) melt forming a third component film including a layer of ethylene vinyl alcohol copolymer, and
 (d) melt forming a fourth component film including a heat-sealable layer; and
 (e) joining together and bonding said first, second, third, and fourth component films.

9. The process for making a composite film comprising:
 (a) melt forming a first component film of a first or surface layer of ethylene vinyl acetate copolymer, a second or core layer of linear low density polyethylene, and a third or surface layer of ethylene vinyl acetate copolymer;
 (b) melt forming a second component film comprising a first or surface layer of a blend of polyethylene and ethylene vinyl acetate copolymer, a second or interior layer of a blend of polyethylene and ethylene vinyl acetate copolymer, a third or adhesive layer, a fourth or interior layer of ethylene vinyl alcohol copolymer, a fifth or interior adhesive layer, and a sixth or surface layer of ethylene vinyl acetate copolymer;
 (c) melt forming a third component film comprising a first or surface layer of ethylene vinyl acetate copolymer, a second or interior layer of linear low density polyethylene, a third or interior layer of ethylene vinyl acetate copolymer, a fourth or barrier layer of vinylidene chloride copolymer, a fifth or interior layer of ethylene vinyl acetate copolymer, and a sixth or surface layer of ethylene vinyl acetate copolymer;
 (d) melt forming a fourth component film comprising a first or surface layer of ethylene vinyl acetate copolymer, a second or core layer of linear low density polyethylene, and a third or surface layer of ethylene vinyl acetate copolymer; and
 (e) joining together and bonding said first, second, third, and fourth component films.

10. The process for preparing a composite film according to claims 8 or 9 wherein the first, second, third, and fourth component films are bonded by corona bonding.

* * * * *